United States Patent [19]

Baer

[11] 4,386,428
[45] May 31, 1983

[54] TRIPLED ND:YAG PUMPED $TM^{3+}$ LASER OSCILLATOR

[75] Inventor: James W. Baer, Nashua, N.H.

[73] Assignee: Sanders Associates, Inc., Nashua, N.H.

[21] Appl. No.: 196,246

[22] Filed: Oct. 14, 1980

[51] Int. Cl.³ ............................................. H01S 3/14
[52] U.S. Cl. ..................................... 372/41; 372/22
[58] Field of Search ...................... 372/23, 22, 41, 108

[56] References Cited

U.S. PATENT DOCUMENTS 3,464,024 8/1969 Bell et al. .............................. 372/108
4,284,962 8/1981 Esterowitz et al. .................. 372/41
4,321,559 3/1981 Esterowitz et al. .................. 372/70

OTHER PUBLICATIONS

Pixton, "Tripling YAG Frequency", *Laser Focus*, Jul. 1978, pp. 66–70.

*Primary Examiner*—James W. Davie
*Attorney, Agent, or Firm*—Louis Etlinger; Richard I. Seligman

[57] ABSTRACT

Multiple frequency, visible laser outputs are obtained from a 1064 nanometer input by tripling the output of an Nd:YAG laser and using the 355 nanometer radiation for downconversion by pumping a Tm:LiYF₄ crystal.

4 Claims, 2 Drawing Figures

TRIPLED ND:YAG PUMPED TM³⁺ LASER OSCILLATOR

BACKGROUND OF THE INVENTION

This invention relates to laser systems and, more particularly, to frequency shifting of lasers.

Presently, there are many optical systems using 532 nanometer laser radiation which is typically obtained from a doubled Nd:YAG laser. The military, particularly, has many applications for such systems. Many of these applications require wavelength diversity in the visible portion of the electromagnetic spectrum. In particular, it is a requirement for particular military scenarios that the systems be capable of emitting two different wavelengths both of which are visible in order to impart to the systems greater resistance to countermeasures from an enemy. In such systems, it is of major import that the wavelengths can be varied such that an enemy does not become accustomed to particular wavelengths and, thus, provide equipment responsive to the particular wavelengths. To employ separate lasers at different wavelengths is impractical because of the accompanying increase in cost and complexity of such systems, particularly in systems where space is of a premium.

To alleviate the necessity of employing additional lasers, frequency diversity is currently being providing by down-shifting the 532 nm output of double Nd:YAG with laser dyes. In many cases, this has proved an unsatisfactory solution to the problem of frequency diversity since the use of dyes has many disadvantages. For example, they readily degrade by bleaching, thereby shortening the stability of such systems. The dyes must also be used in solvents which are flammable and toxic. The dyes additionally have poor thermal properties which leads to degradation of beam quality, and require plumbing to flow the liquids.

Accordingly, it is an object of this invention to provide improved laser frequency diversity.

It is another object of this invention to provide laser frequency diversity by using a solid state laser downconverter.

SUMMARY OF THE INVENTION

Briefly, in one embodiment, laser frequency diversity is provided by employing a tripled Nd:YAG laser, which outputs laser radiation at 355 nanometers, to pump a Tm:LiYF₄ crystal which emits at other frequencies. Since the military is replete with doubled Nd:YAG lasers in its inventory, additional frequency diversity is achieved by merely employing the 1064 nanometer and doubled 532 nanometer outputs of the doubled Nd:YAG lasers and mixing them to provide a 355 nanometer output which is used to pump a Tm:LiYF₄ crystal. One particular frequency of interest from the Tm:LiYF₄ crystal is 453 nanometers. By employing 355 nanometer radiation to pump the Tm:LiYF₄ crystal, a 453 nanometer output will be provided at relatively high efficiency.

By providing a cavity for the Tm:LiYF₄ laser including a mirror coated for an output at 453 nanometers, the laser system will provide both 453 and 355 nanometer radiation. Since Tm:LiYF₄ has a 'D₂ emission at 453 nm, 520 nm, 670 nm, 760 nm and 800 nm compatible with tripled Nd:YAG, additional frequency diversity is achieved merely by changing the coating on the mirror of the Tm:LiYF₄ laser for outputs at other frequencies.

In an alternative embodiment, a prism is inserted in the Tm:LiYF₄ laser cavity and a rotatable broadband mirror employed to provide frequency diversity by merely positioning the broadband output mirror such that it will receive the desired output from the prism.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
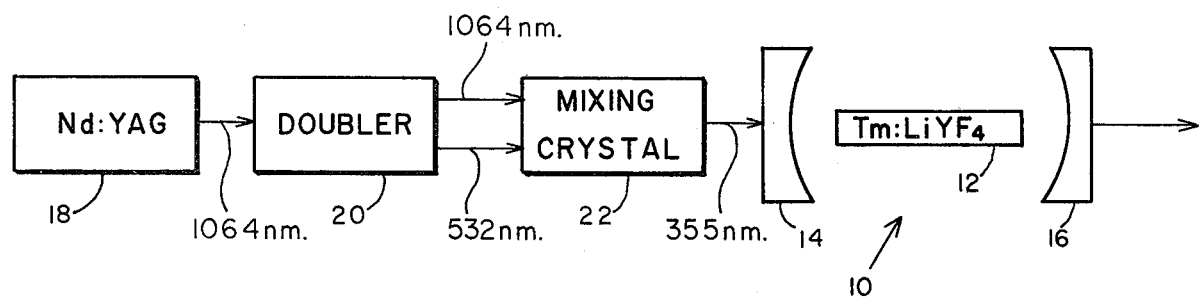
FIG. 1 is a block diagram illustrating a first embodiment of the invention.

Referring now to FIG. 1 of the drawings, there is illustrated thereby a first embodiment of the invention. The laser oscillator comprises a laser 10 including a crystal 12 disposed between a pair of mirrors 14 and 16 forming an optical resonator. If desired, reflective materials can be deposited on the ends of crystal 12 in place of mirrors 14 and 16 as is conventional. In this embodiment, crystal 12 is a Lithium Yttrium Fluoride (LiYF₄) host doped with Thulium (Tm³⁺).

Pump energy for the Tm:LiYF₄ crystal is supplied by a second laser rather than a flash lamp. In this embodiment, pump energy is derived from a Nd:YAG laser 18. The output (1064 nm) is coupled to a doubling crystal 20 to provide outputs at 1064 nm and 532 nm. These two wavelengths are applied to a mixing crystal 22 to generate pump energy at 355 nm. The pump energy from the mixing crystal 22 is applied to the Tm:LiYF₄ crystal to cause a population inversion and cause an output from mirror 16 of the optical resonator.

In the preferred embodiment mirror 14 is configured to be highly transmissive at 355 nm and highly reflective at 453 nm. Mirror 16 is configured so that it is partially transmissive at the desired output wavelength, 453 nm for example. This system fulfills all of the objects of the invention in that it provides two distinct visible wavelengths, 355 nm and 453 nm. The system is also adaptable for providing further visible outputs in that the mirrors 14 and 16 can be otherwise configured as for example by applying coatings thereon to provide outputs from the laser 10 at 520 nm, 670 nm, 760 nm and 800 nm. The system is highly desirable for military applications in that the doubled Nd:YAG laser is the most common of lasers employed by the military and merely by mixing the 1064 and 532 nm outputs therefrom, radiation at 355 nm is obtained for easy pumping of the Tm:LiYF₄ crystal because the tripled output from the Nd:YAG laser (355 nm) coincides with the 'D₂ absorption of the Tm:LiYF₄ crystal 12.

Frequency diversity is provided at minimal cost increase because the only requirement is an add-on to conventional Nd:YAG systems, the add-on comprising the mixer 22 and the laser 10. The output of the system is capable of providing many frequencies since a choice of specific lines can be generated by proper mirror selection. A particular frequency is obtained by the proper coating of mirrors 12 and 14 as mentioned above.

Figure 2:
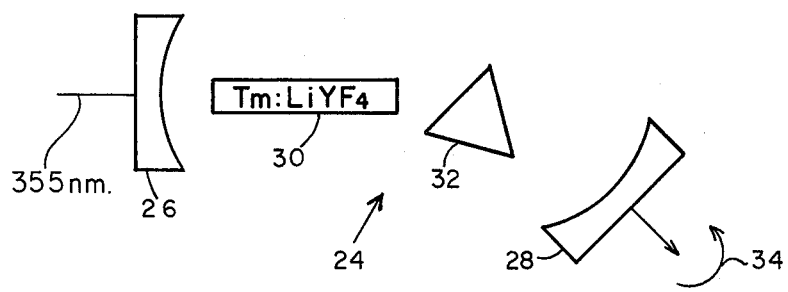
FIG. 2 is a block diagram of an alternate embodiment of the invention.

An alternative embodiment of this invention is shown in FIG. 2 of the drawings, wherein the 355 nm radiation is applied to a laser 24 including a resonant cavity having a first mirror 26 and a second mirror 28. Intermediate, the mirrors 26 and 28 is a Tm:LiYF$_4$ crystal 30 and a prism 32. In this embodiment, mirror 28 is disposed in such a manner that it is rotatable as shown by line 34, so as to receive radiation from different portions of prism 32 depending upon the position of the mirror 28 with respect to prism 32. In this embodiment, the mirrors are broadband and prism 32 is employed as the wavelength selecting device.

While specific embodiments employing 355 nm radiation from a tripled Nd:YAG laser to pump a Tm:LiYF$_4$ laser have been described, it is to be understood that the embodiments shown are illustrative only, and that many variations and modifications may be made without departing from the principles of the invention herein disclosed and defined by the appended claims.

I claim:

1. A downconverter laser oscillator, comprising:
a resonant cavity;
means for extracting energy from said cavity;
a Tm:LiYF$_4$ crystal disposed within said resonant cavity; and
a tripled Nd:YAG laser for pumping said Tm:LiYF$_4$ crystal with coherent radiation at 355 nanometers.

2. The laser oscillator of claim 1, further including a prism disposed within said resonant cavity and wherein said resonant cavity includes a pair of mirrors one of which is position variable so as to receive a particular wavelength of refracted energy from said prism.

3. The laser oscillator of claim 1 wherein said resonant cavity includes mirrors which can be selected to emit radiation at 453 nm, 520 nm, 670 nm, 760 nm and 800 nm.

4. A method of providing downconversion from a first laser emitting at 1064 nanometers, comprising the steps of:
doubling the output of said first laser to provide 532 nanometer radiation;
mixing the 1064 and 532 nanometer radiation to generate radiation at 355 nanometers;
providing a Tm:LiYF$_4$ laser; and
pumping said Tm:LiYF$_4$ laser with the 355 nanometer radiation.

* * * * *